United States Patent [19]

Kikuchi

[11] Patent Number: 5,581,673

[45] Date of Patent: Dec. 3, 1996

[54] METHOD AND DEVICE FOR DIVIDING AND DRAWING POLYGONS

[75] Inventor: Toshio Kikuchi, Yokohama-shi, Japan

[73] Assignee: Fujitsu Limited, Kawasaki, Japan

[21] Appl. No.: 300,914

[22] Filed: Sep. 6, 1994

[30] Foreign Application Priority Data

Dec. 7, 1993 [JP] Japan .................................. 5-306738

[51] Int. Cl.$^6$ ...................................................... G06T 17/30
[52] U.S. Cl. .............................................. 395/123; 395/143
[58] Field of Search ...................................... 395/123, 133, 395/143

[56] References Cited

FOREIGN PATENT DOCUMENTS 60-256874  12/1985  Japan .

*Primary Examiner*—Heather R. Herndon
*Assistant Examiner*—Rudolph Buchel
*Attorney, Agent, or Firm*—Staas & Halsey

[57] ABSTRACT

A polygon dividing section divides a polygon which is stored in a polygon graphic data storage area into a number of triangles, with the associated vertex information being distributed among the triangles. In doing this, based on category information which indicates that separated triangles are first, intermediate, or last triangles of the polygon and also based on the edge numbers of the separated triangles, the polygon dividing section selects either edge data or divided edge data, the latter of which indicates an invisible edge, which are stored in the polygon graphic data storage area, and outputs the vertex data of the triangles along with either the edge data or divided edge data to a triangle set graphic data storage area. A triangle drawing section, based on the triangle vertex information stored in the triangle set graphic data storage area, draws the separate triangles on a display device.

3 Claims, 10 Drawing Sheets

| EDGE | VERTEX CONTROLLING EDGE | VISIBILITY OF SURROUNDING OUTLINE OF EDGE |
|---|---|---|
| i | ① | VISIBLE |
| ii | ② | INVISIBLE |
| iii | ③ | VISIBLE |
| iv | ④ | VISIBLE |
| v | ⑤ | INVISIBLE |

TRIANGLE(a)  TRIANGLE(b)  TRIANGLE(c)

| TRIANGLE | EDGE | VERTEX THAT CONTROLS EDGE | VISIBILITY OF SURROUNDING LINE OF EDGE |
|---|---|---|---|
| (a) | i | ① | VISIBLE |
|  | ii | ② | INVISIBLE |
|  | iii' | ③ | INVISIBLE |
| (b) | i' | ① | INVISIBLE |
|  | iii | ③ | VISIBLE |
|  | iv' | ④ | INVISIBLE |
| (c) | i" | ① | INVISIBLE |
|  | iv | ④ | VISIBLE |
|  | v | ⑤ | INVISIBLE |

Fig.6

| VERTEX | VERTEX DATA | | EDGE INFORMATION | |
|---|---|---|---|---|
| | COORDINATES | ---- | INFORMATION WHICH CONTROLS THE VISIBILITY OF THE SURROUNDING OUTLINE | ---- |
| (1) | ✶ ✶ | | VISIBLE | |
| (2) | ✶ ✶ | | INVISIBLE | |
| ⋮ | ⋮ | | ⋮ | |
| (n) | ✶ ✶ | | VISIBLE | |

Fig.7

| |
|---|
| a. TOTAL NUMBER OF TRIANGLES (=NUMBER OF POLYGON VERTICES-2) |
| b. TRIANGLE SEQUENCE NO. |
| c. POINTERS(1), (2), AND (3) TO VERTEX DATA |

Fig.8

| OVERALL NUMBER OF TRIANGLES | TRIANGLE SEQUENCE NO. | CATEGORY | EDGE SEQUENCE NO. | VERTEX INFORMATION SELECTION FLAG |
|---|---|---|---|---|
| n | 1 | FIRST TRIANGLE | 1 | EDGE DATA |
| | | | 2 | EDGE DATA |
| | | | 3 | DIVIDED EDGE DATA |
| | 2 | INTERMEDIATE TRIANGLE | 1 | DIVIDED EDGE DATA |
| | | | 2 | EDGE DATA |
| | | | 3 | DIVIDED EDGE DATA |
| | ⋮ | | ⋮ | ⋮ |
| | n−1 | | | |
| | n | LAST TRIANGLE | 1 | DIVIDED EDGE DATA |
| | | | 2 | EDGE DATA |
| | | | 3 | EDGE DATA |

Fig.9

| TRIANGLE | VERTEX DATA | | | EDGE INFORMATION | |
|---|---|---|---|---|---|
| | COORDINATES | | .... | VISIBILITY OF SURROUNDING OUTLINE OF EDGE | .... |
| (1) | ∴∴∴ | | | VISIBLE<br>INVISIBLE<br>INVISIBLE | |
| (2) | ∴∴∴ | | | INVISIBLE<br>VISIBLE<br>INVISIBLE | |
| ⋮ | ⋮ | ⋮ | ⋮ | ⋮ | ⋮ |
| (n−2) | ∴∴∴ | | | INVISIBLE<br>VISIBLE<br>INVISIBLE | |

5,581,673

METHOD AND DEVICE FOR DIVIDING AND DRAWING POLYGONS

BACKGROUND OF THE INVENTION

1. Field of the Invention

The present invention relates to a divided polygon drawing method and device therefor, for use in a graphic drawing device applied to the field of computer graphics and, more specifically, to a method of divided polygon drawing capable of high-speed generation of vertex information when dividing a polygon, and to a device therefor.

2. Description of the Related Art

Devices and methods for dividing a convex polygon into triangles and drawing the convex polygon on a high-speed triangle drawing device have been known in the past.

A prior art graphic drawing device generally consists of a convex polygon dividing device which divides the convex polygon into triangles, and a triangle drawing device which has a plurality of triangle drawing means, the processing of the plurality of triangle drawing means being performed simultaneously, with drawing being done on a display device.

In the above-noted graphic drawing device, the following problems arise when dividing a convex polygon into triangles.

Of the vertex information of the convex polygon, there are cases in which, by dividing a convex polygon, the same given vertex will have different vertex information in different adjacent triangles. One such type of information is information for each vertex of a convex polygon which controls the respective edges from a vertex to the next vertices, for example, the information which controls the visibility of the external perimeter. In the discussion which follows, the term "vertex data" will be used for vertex information which does not change due to division, the term "edge data" will be used for other vertex information, the term "edge data" will be used for edge data which does not change due to the division, and the term "divided edge data" (indicating that the line is not visible) will be used for edge data which changes because of the division.

In the past, when using "vertex data" to draw the separated triangles, after performing filling in, etc., of the areas inside each of the triangles using the coordinates of each of the vertices, the above-noted "vertex data" and "edge data" were used to draw the surrounding outline. The reason for this was that there were cases when the division would cause the "edge data" which belonged to a vertex (vertex data) to become "divided edge data."

Therefore, with the prior art technology, there was a problem in that it was not possible to draw the surrounding outline until the drawing of all of the triangles was completed, the processing speed being established by the processing for the drawing of the triangles, which requires the most time, thereby preventing the achievement of high-speed processing.

SUMMARY OF THE INVENTION

The present invention was made to solve the above-described problems with the prior art technology, and has an object not only the achievement of high drawing processing speed, but the simplification of the system, by making use of a simple method of controlling the vertex data of the plurality of triangles occurring when a polygon is divided, making possible the simultaneous drawing of the separated triangles and the surrounded outline.

The present invention provides a divided polygon drawing method, in which a polygon is divided by means of diagonal lines into a number of separate triangles, the vertex information for these separate triangles is output to a triangle drawing section and the drawing being done on a display device. In this method, the separate triangles are categorized according to the number of edges they have that correspond to edges of the polygon, selection being made based on the category information and position information for the edges of each of the triangles either of the edge data of the triangles or of the divided edge data, which indicates a diagonal line of the polygon, and the vertex information being generated by this method from the vertex data of the separate triangles and edge data or divided edge data.

The present invention also provides a polygon divided drawing device, which has a polygon graphic data storage area into which is stored the vertex information of a polygon, a polygon division section which divides the vertex information which is stored into that polygon graphic data storage area into triangles, and a triangle set graphic data storage area into which is stored vertex information of the set of triangles into which the polygon is divided, and which draws onto a display by outputting the vertex information of the triangle set which is stored into the triangle set graphic data storage area to a triangle drawing section, and wherein is provided a distribution data control table into which is stored data which establishes correspondence between the separated triangles and the vertex information which is stored in the polygon graphic data storage area, the polygon division section selecting, based on the category data which indicates how many edges the separated triangles correspond to edges of the polygon and on the edge position information of the separated triangles, either edge data or divided edge data, which indicates a diagonal line of the polygon, which is stored in the polygon graphic data storage area, the results of this selection being used as the basis for referencing the distribution data control table to read out the vertex data and edge data of the separate triangles from the polygon graphic data storage area, and to generate the triangle vertex information from the edge data or divided edge data and vertex data.

In addition, in the present invention, the polygon divided drawing device has a vertex information selection table into which are stored vertex information selection flags, which indicate that selection is to be made of triangle category data, triangle edge numbers, or edge data or divided edge data corresponding to these, the triangle division section referencing the vertex information selection table to read out the vertex information selection flags which correspond to category information and edge position information of the separate triangles, the read out vertex information selection flags being used as the basis for selection of either the edge data or the divided edge data, which indicates a diagonal line of the polygon, which are stored in the polygon graphic data storage area, and generation of vertex information for the triangles.

BRIEF DESCRIPTION OF THE DRAWINGS

The present invention will be more clearly understood from the description as set forth below, with reference to the accompanying drawings.

FIG. 6 is a drawing which shows an example of a convex polygon display list.

FIG. 7 is a drawing which shows an example of the contents of a distribution information control table.

FIG. 8 is a drawing which shows an example of the contents of a vertex information selection table.

FIG. 9 is a drawing which shows an example of the contents of a display list of a separate triangle.

DESCRIPTION OF THE PREFERRED EMBODIMENTS

Before describing the preferred embodiments according to the present invention, examples of the related art are provided, with reference made to the drawings.

Figure 1:
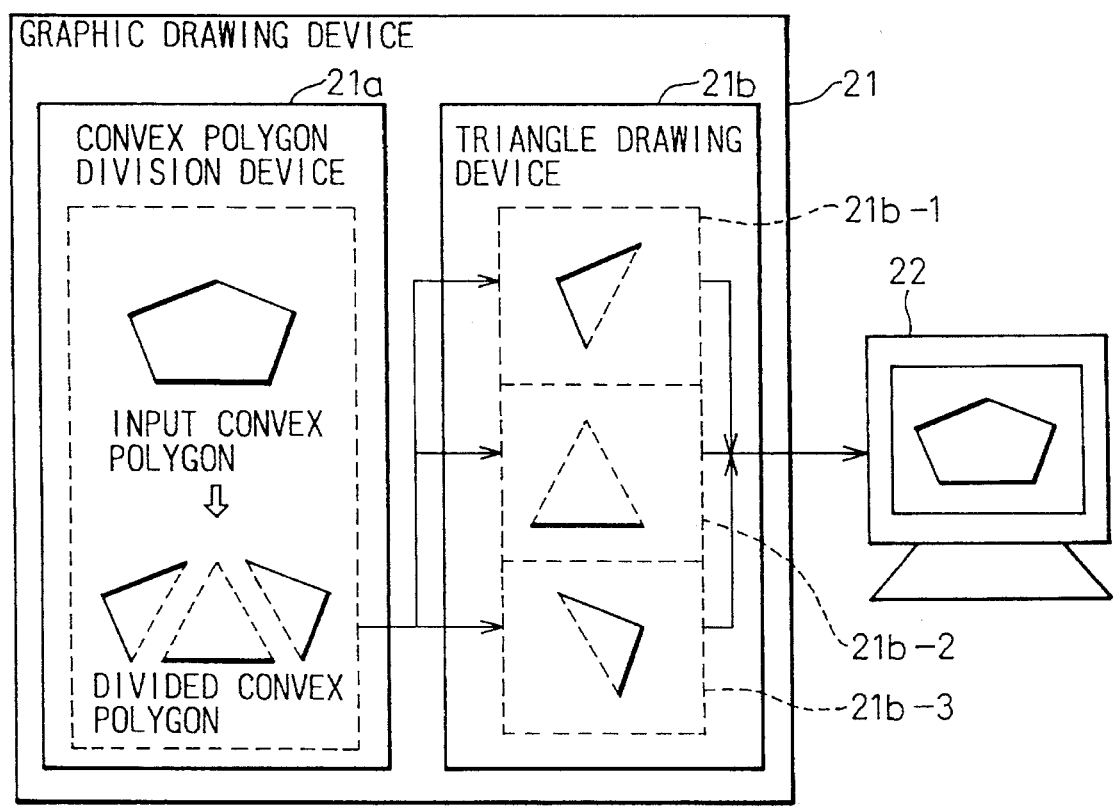
FIG. 1 is a block diagram which shows the overall configuration of the drawing device which is a prerequisite for the present invention.

FIG. 1 is a block diagram which shows the overall configuration of a graphic drawing device, which is a prerequisite for the present invention.

In FIG. 1, 21 is a graphic drawing device, 21a is a convex polygon dividing device which divides a convex polygon into triangles, and 21b is a triangle drawing device which draws triangles. The convex polygon drawing device 21a divides an input convex polygon into a number of separate triangles by joining a vertex with other vertices that are not adjacent vertices, the vertex information for the resulting triangles being sequentially output to the triangle drawing device 21b. The triangle drawing device 21b has, for example as shown in the same drawing, the three convex polygon divided separate triangle drawing means 21b-1, 21b-2, and 21b-3, and uses these means to perform simultaneous processing of the three triangles separated by the convex polygon dividing device 21a and to draw them on a display device 22.

In the above-described graphic drawing device, in dividing a convex polygon into triangles, the following problems arise.

Specifically, of the vertex information of a convex polygon, there are cases in which, by dividing a convex polygon, the same given vertex will have different vertex information in different adjacent triangles. An example of this is, for each vertex of a convex polygon, the information which controls the edges from the vertices to the next vertices, for example the information which controls the visibility of the surrounding outline.

Figures 2A, 2B:
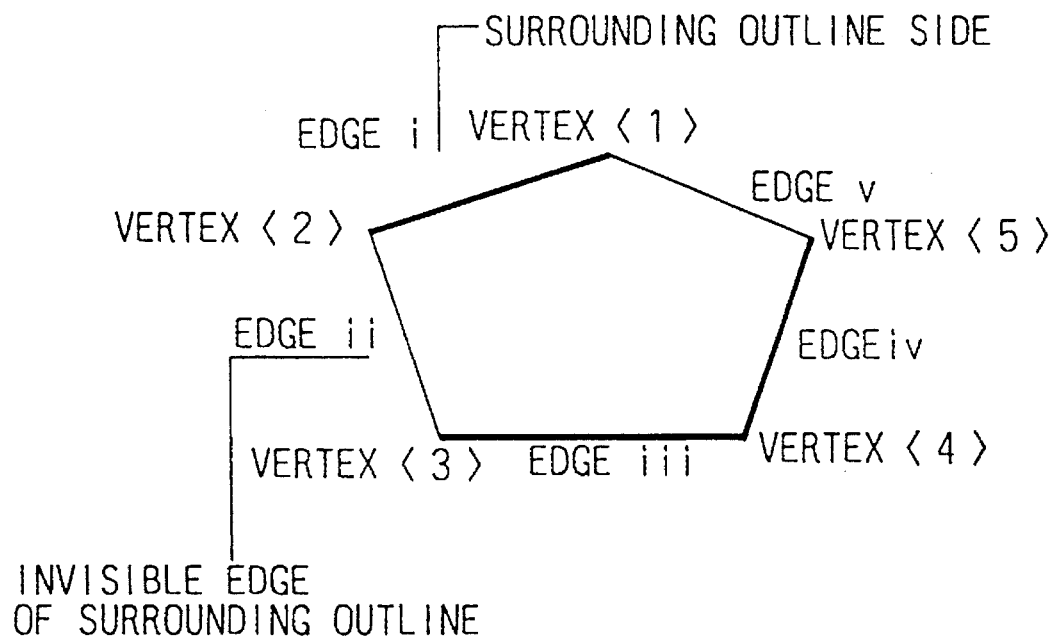
FIG. 2(A) is a drawing which shows an example of a convex polygon and its surrounding outline.
FIG. 2(B) is a drawing which shows the vertex information of FIG. 2(A).

FIG. 2(A) and (B) and FIG. 3(A) and (B) are all examples of dividing a convex polygon, for which the surrounding outline visibility has been specified, into triangles, and the above-noted problem will next be explained, making reference to these drawings.

FIG. 2(A) shows a convex polygon which has been input, edges i, iii, and iv shown by thick solid lines being visible edges, and edges ii and v shown by thin solid lines being invisible edges.

FIG. 2(B) shows a list of vertex information related to the surrounding outline of the convex polygon shown in FIG. 2(A). In FIG. 2(B), the vertex information for each of the vertices includes information related to the visibility of the surrounding outline of each of the edges. For example, edge i is visible, and the information related to that visibility is included in the vertex information of vertex <1>.

Figures 3A, 3B:
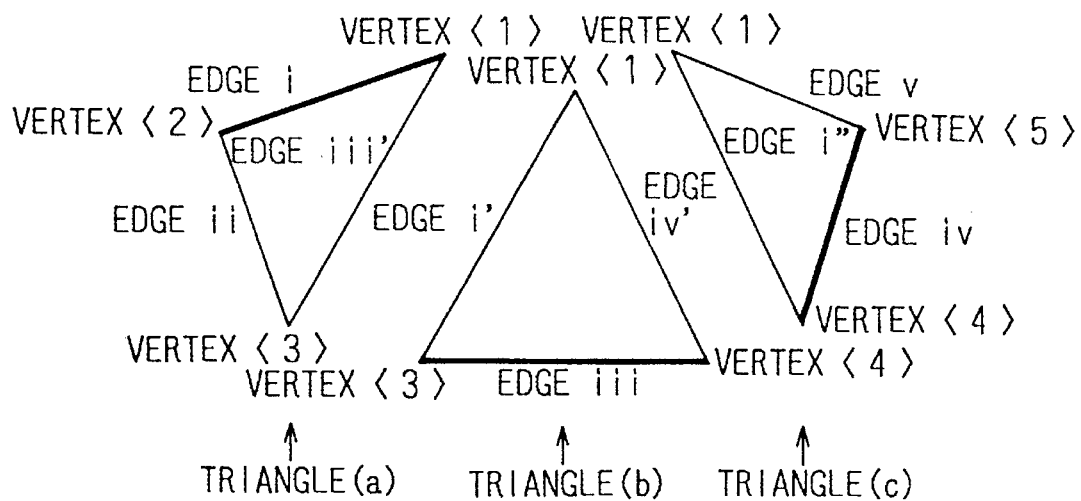
FIG. 3(A) is a drawing which shows an example of separated triangles and their surrounding outlines.
FIG. 3(B) is a drawing which shows the vertex information of FIG. 3(A).

FIG. 3(A) shows an example of dividing the convex polygon shown in FIG. 2(A) into triangles, and FIG. 3(B) is a list of vertex information related to the surrounding outlines of each of the separate triangles.

In FIG. 3(A), division has been done into the three triangles (a), (b), and (c), the edges newly generated by this division (edges iii', i', and i") being invisible edges. Further, although in FIG. 2(A) and (B) and in FIG. 3(A) and (B), the sequence of the specification of vertices is counterclockwise, the same applies if the specification of vertices is made in the clockwise direction.

In each of the above-noted drawings, if vertices <1>, <3>, and <4> are observed, it will be noted that each of these vertices as a result of the division process, become vertices which control two or three edges. That is, vertex <1> controls edge i for triangle (a), edge i' for triangle <b>, and edge i" for triangle (c). vertex <3> controls edge iii' for triangle (a) and edge iii for triangle (b), and vertex <4> controls edge iv' for triangle (b) and edge iv for triangle (c).

In this case, if the visibility of the surrounding outline of the convex polygon is specified as shown in the prior art examples of FIG. 2(A) and FIG. 2(B), when dividing the convex polygon into triangles as shown in FIG. 3(A), the information related to the visibility of the surrounding outline which each of the vertices of the triangles controls, as shown in FIG. 3(B), will differ for each of the edges.

With the prior art technology, because the information as shown in FIG. 3(B) was not controlled, in the case in which a vertex is specified for the drawing of a separate triangle, considering the case in which the division causes the "edge data" for that vertex (vertex data) to change to "divided edge data," after the area of each of the triangles is filled in according to the coordinates of each of the triangle's vertices and the drawing of the triangle is completed, the surrounding outline was drawn separately, using the "vertex data" and "edge information."

Next, the polygon divided drawing device and method according to the present invention will be described.

Figure 4:
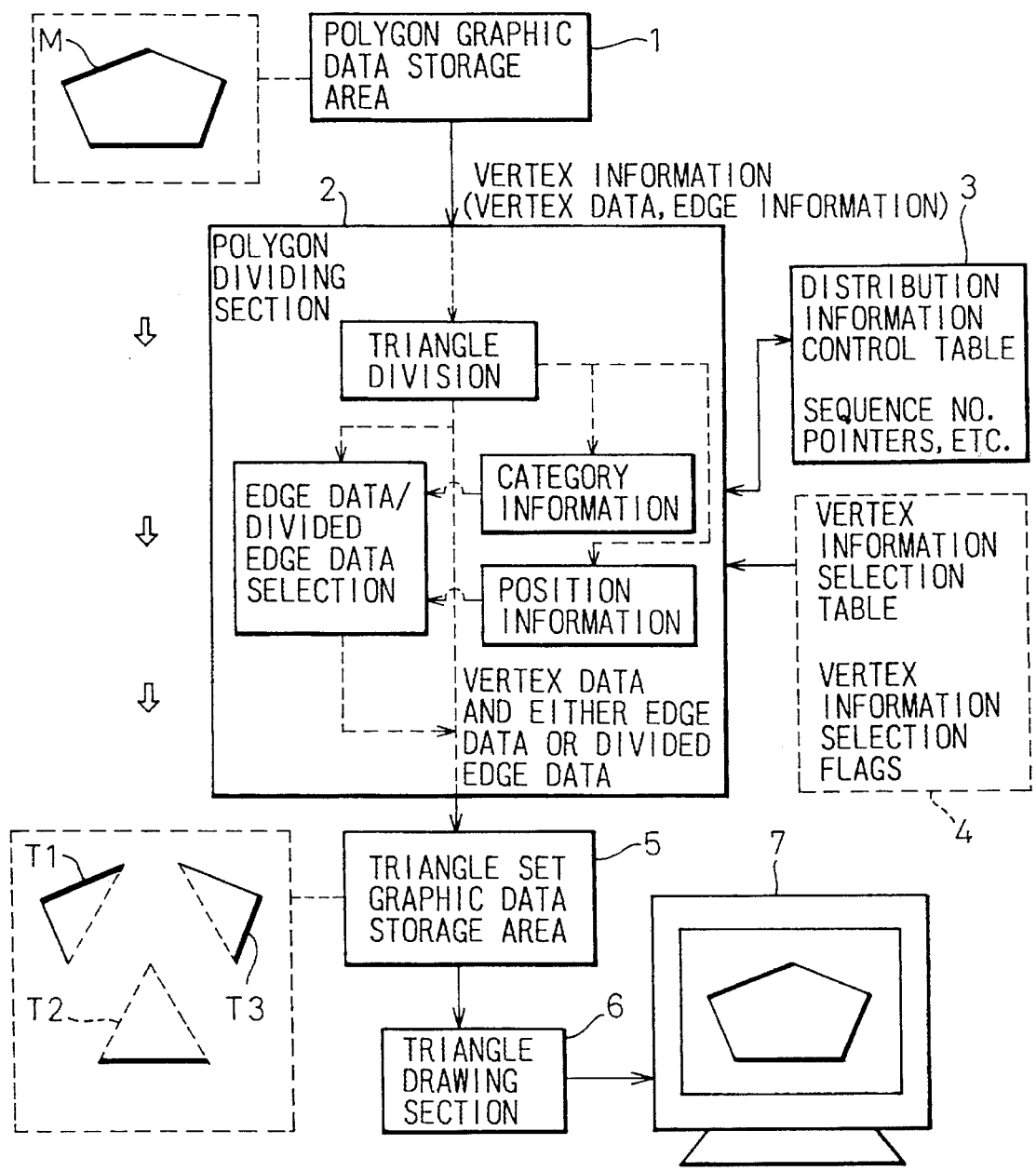
FIG. 4 is a drawing which shows the basic configuration of a polygon divided drawing device according to the present invention.

FIG. 4 shows the principle of a polygon divided drawing device according to the present invention.

In FIG. 4, 1 is a polygon graphic data storage area into which is stored vertex information for a polygon, 2 is a polygon dividing section which divides a polygon into triangles, 3 is a distribution information control table into which is stored the sequence numbers of the separate triangle pointers to vertex information of the triangles, 4 is a vertex information selection table into which is stored such information as vertex information selection flags which correspond to triangle sequence numbers and edge numbers, 5 is a triangle set graphic data storage area into which is stored the vertex information for the set of separated triangles, 7 is a display device, 6 is a triangle drawing section which draws each of the separate triangles on the display device 7 based on the vertex information for the set of triangles which is stored in the triangle set graphic data storage area 5, M is a polygon to be divided, and T1, T2, and T3 are triangles which are divided from polygon M.

According to the present invention, the polygon M is divided by diagonal lines into the plurality of triangles T1, T2, and T3, the vertex information of these separate triangles T1, T2, and T3 being output to the triangle drawing section 6, with the original polygon M being reconstructed on the display device 7. The separate triangles T1, T2, and T3 are categorized by the number of edges they each have that correspond to edges of the polygon M, selection then being made, based on the category information of each of the triangles T1, T2, and T3 and also on position information of the edges of triangles T1, T2, and T3, of either edge data of the polygon M or divided edge data which indicates a diagonal line of the polygon, vertex information for each of the triangles being generated from the vertex data of the separate triangles and the above-selected edge data or divided edge data.

Stated in terms of FIG. 4, polygon graphic data storage area 1 stores the vertex information of polygon M, and polygon division section 2 divides the vertex information for polygon M which is stored in the polygon graphic data storage area 1 into triangles T1, T2, and T3. The triangle set graphic data storage area 5 stores the vertex information of the set of separate triangles and outputs the vertex information of the set of triangles stored in the triangle set graphic data storage area 5 to the triangle drawing section 6, the original polygon M being displayed on the display device 7. The distribution information control table 3 is used to store the information which establishes correspondence between triangles T1, T2, and T3 and the vertex information stored in the polygon graphic data storage area 1. The polygon division section 2 makes a selection, based on the category data which indicates how many of the edges of triangles T1, T2, and T3 correspond to edges of polygon M and based also on the edge position information of the triangles, of either the edge data or the divided edge data, which indicates a diagonal line of the polygon, and which was stored in the polygon graphic data storage area 1, reference being made of to the distribution information control table 3, based on the result of that selection, and readout being performed of the vertex data and either edge data or divided edge data of the separate triangles T1, T2, and T3, with vertex information for the triangles T1, T2, and T3 being generated from the edge data or the divided edge data and the vertex data.

The vertex information selection table 4 is used to store the category information for the triangles T1, T2, and T3, the edge numbers of triangles T1, T2, and T3, and the vertex information selection flags which indicate whether to select the edge data or the divided edge data which is stored in the polygon graphic data storage area in correspondence with these edge numbers. The polygon division section 2 references the vertex information selection table 4 and reads out vertex information selection flags corresponding to the category information and edge position information of the separate triangles and, based on the read out vertex information selection flags, selects either the edge data or the divided edge data stored in the polygon graphic data storage area 1 and generates the vertex information of triangles T1, T2, and T3.

If we look at the vertex data in FIG. 3(A) and FIG. 3(B), we can see that the 1st vertices of triangles (a), (b), and (c) are all vertex <1>, and that the 2nd vertices and 3rd vertices of each triangle are vertices <2> and <3>, vertices <3> and <4> and vertices <4> and <5>, these being pairs which are each shifted by one vertex. In addition, if we look at the "edge data" and "divided edge data," we can observe a regularity in that the change of "edge data" to "divided edge data" occurs starting at the 2nd triangle (in this drawing, triangle (b) and triangle (c)), and that, of the plurality of triangles output, with the exception of the last triangle (that is, in this drawing triangles (a) and (b)), with regard to pairs of vertices, the "edge data" of the 2nd vertex (that is, the last vertex in each triangle) changes to divided edge data.

That is, if we observe the 1st vertex of each of the triangles, we see that it is appropriate to output "edge data" for the 1st triangle only, with "divided edge data" output for subsequent triangles, and if we then observe the 2nd vertex, we see that it is appropriate to output "edge data" for all triangles, and further if we observe the 3rd vertex, we can see that it is appropriate to output "edge data" for the last triangle only, with "divided edge data" being output for the preceding triangles.

Therefore, when a polygon is divided into separate triangles, based on the above-described regularity, if the "edge data" or "divided edge data" is selected and this "edge data" or "divided edge data" is output together with the vertex data of the triangles, it is possible for the triangle drawing section 6 to draw the triangles and the surrounding outline simultaneously.

Based on the above principle, the present invention was made to divide the vertex information of a polygon into the vertex information of triangles, and according to the present invention the separate triangles T1, T2, and T3 are categorized according to how many of their edges correspond to edges of the polygon M, and based on the category information of triangles T1, T2, and T3 and the position information of the edges of triangles T1, T2, and T3, selection is made of either the edge data or the divided edge data, vertex information for the triangles being generated from the vertex data of the polygon which is divided into triangles and from the edge data or divided edge data selected as described above, this enabling not only high-speed drawing processing but also system simplification.

In addition, by providing a vertex information selection table 4 into which is stored vertex information selection flags, it is possible to reference this vertex information selection table 4 to select either edge data or divided edge data, thereby simplifying the selection of either edge data or divided edge data.

Figure 5:
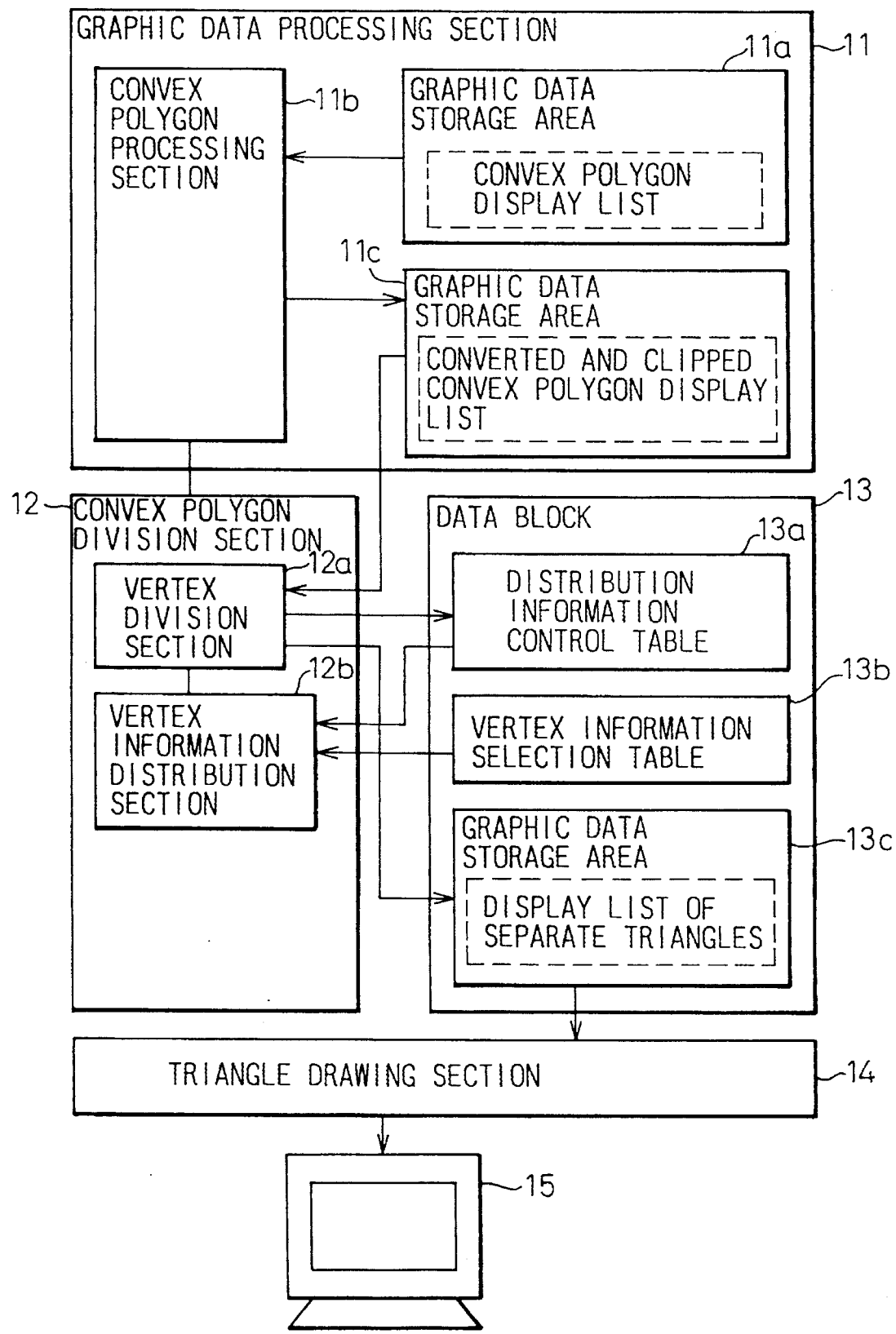
FIG. 5 is a block diagram which shows an embodiment of the polygon divided drawing device of the present invention.

FIG. 5 a block diagram which shows the overall configuration of an embodiment of the present invention.

In FIG. 5, 11 is a graphic data processing section which processes graphic data of the convex polygon, 11a is 1st graphic data storage area into which is stored a convex polygon display list consisting of vertex information of the convex polygon, 11b is a convex polygon processing section which performs such processing as conversion and clipping of the graphic data which is stored in the 1st graphic data storage area 11a, and 11c is a 2nd graphic data storage area into which is stored a convex polygon display list which is converted and clipped in the convex polygon processing section 11b.

FIG. 6 is a drawing which shows an example of the contents of a convex polygon display list which is stored in the 2nd graphic data storage area 11c, in which drawing it is shown that, in the graphic data storage area 11c, for each convex polygon is stored a convex polygon display list consisting of such data as the coordinate data for each vertex and edge information which controls whether a edge from a vertex to the next vertex is visible, this corresponding to the previous example shown in FIG. 2(B).

In FIG. 5, 12 is a convex polygon division section which divides a convex polygon stored in the graphic data storage area 11c into a number of triangles, 12a is a vertex division section which divides vertices of the convex polygon into respective vertices of the triangles, and 12b is a vertex information distribution section which distributes the vertex data, edge data, and divided edge data derived by dividing the vertices.

In FIG. 5, 13 is a data block into which is stored the table which is referenced when a convex polygon is divided and a display list of the set of separate triangles, 13a is a distribution information control table into which is stored the sequence numbers and the pointers (to be described later) for each vertex of triangles which are undergoing vertex distribution processing.

FIG. 7 is a drawing which shows an example of the contents of the above-noted distribution information control table 13a into which is stored, as shown in this drawing, a., which is the total number of separate triangles, b., which is the sequence number of the triangle currently being processed, and c., which is the pointer to the convex polygon display list for each of the triangle vertices, these being referenced when the above-noted vertex information distribution section 12b distributes vertex information to each triangle.

Of the above items, the triangle sequence number of part b. is the number which is assigned to each triangle, based on the convex polygon display list, when the convex polygon is divided into triangles, these being in the case of FIG. 3 (A), for example, No. 1 for triangle (a), No. 2 for triangle (b) and No. 3 for triangle (c).

The pointers of part c consist of the information which indicates where each piece of vertex information for the convex polygon is stored (the storage position of each piece of vertex information of the convex polygon display list (refer to 11c of FIG. 5)), and in the case of FIG. 3 (A) during the processing of the vertex information of triangle (a), the pointers to the convex polygon display list for vertices <1>, <2>, and <3> of triangle (a) are stored here.

In FIG. 5, 13b is a vertex information selection table into which is stored the triangle sequence numbers of categories (to be described later), and vertex information selection flags which indicate whether the corresponding triangle vertex information is edge data or divided edge data, this vertex information selection table 13b being referenced to distribute the vertex information to each triangle when the above-noted vertex information distribution section 12b divides a convex polygon.

FIG. 8 shows an example of the contents of the vertex information selection table 13b which has stored in it, as shown in this drawing, the sequence numbers and categories of the triangles, the sequence numbers of each triangle edge and the vertex information selection flags which indicate whether the data for each edge is edge data or divided edge data.

In this table, the triangle category is the information which indicates whether a separated triangle is the first triangle, intermediate triangle, or the last triangle in a given convex polygon, and in FIG. 3 (A), for example, the category of triangle (a) is first triangle, the category of triangle (b) is intermediate triangle, and the category of triangle (c) is last triangle, and when there are four or more triangles the category of triangles from the second to the next-to-last triangle, inclusive, is intermediate triangle. Further, the above-noted vertex information selection flags are established, based on the previously described regularity of edge data of separated triangles changing to divided edge data.

In FIG. 5, 13c is a 3rd graphic data storage area into which is stored the display list for the triangle set generated by the convex polygon division section 12; into this 3rd graphic data storage area 13c is stored, as shown in FIG. 9, vertex data such as the coordinates of vertices for each of the separate triangles and vertex information such as edge information which controls the visibility of the surrounding outlines of edges, this corresponding to the previously described FIG. 3(B).

In FIG. 5, 14 is a triangle drawing section which has a number of triangle drawing means, as shown in FIG. 1, and which draws simultaneously onto display device 15 the plurality of separate triangles and their surrounding outlines, based on the display list of the set of triangles which is stored in the 3rd graphic data storage area 13c.

Next, an embodiment related to the processing of the division of a convex polygon in the convex polygon division section 12 of FIG. 5 is described.

In the 2nd graphic data storage area 11c is stored the display list (refer to FIG. 6) of the convex polygon which was converted and clipped at the convex polygon processing section 11b. When dividing the convex polygon stored in the 2nd graphic data storage area 11c into triangles, first, the vertex division section 12a of the convex polygon division section 12 references the convex polygon display list which is stored in the 2nd graphic data storage area 11c, and sets a., the total number of convex polygons to be divided, b., the sequence numbers of the triangles, and c. the pointers for the vertex data, which are shown in FIG. 7, into the distribution information control table 13a.

For example, in the case in which 2 is subtracted from the total number of vertices of the convex polygon to determine the number of triangles to be separated and when the triangle to be separated is the first triangle in the convex polygon, the 3rd vertex information from the top of the display list is extracted, No. 1 being set as the sequence number, b., and the pointer values to the vertex information for the 1st to 3rd vertices of the convex polygon which correspond to the each vertex of the triangle are set as the pointers. The number of entries in the vertex information selection table 13b is made to coincide with the overall number of separate triangles. For example, if the overall number of separate triangles is four, the size of the table is adjusted to that there will be two triangles belonging to the intermediate category.

Next, the vertex information distribution section 12b of the convex polygon division section 12 references the above-noted distribution information control table 13a, extracts the sequence number of the triangle to be separated, and reads from the vertex information selection table 13b, shown in FIG. 8, the vertex information selection flag of the edge that controlled from the 1st vertex of the triangle which corresponds to the above sequence number. For example, in the case in which the triangle to be separated is the 1st triangle of the convex polygon, "edge data" will be read out as the vertex information selection flag for the sequence number 1 edge.

Next, the vertex division section 12a references the 2nd graphic data storage area 11c, based on the pointer, c., to the vertex data, and reads out the 1st vertex information of the triangle. Based on the vertex information selection flag read out by the vertex information distribution section 12b, the edge information controlled by the 1st vertex is determined as being either "edge data" or "divided edge data."

Then, in the case in which the edge information controlled by the 1st vertex is "edge data," the edge information of the vertex read out from the 2nd graphic data storage area 11c is selected as its edge information, both the vertex data and the edge data being output to the 3rd graphic data storage area 13c. In the case, however, in which edge data controlled by the 1st vertex is "divided edge data," "divided edge data" which indicates that the edge is invisible is selected, both the vertex data and the divided edge data being output to the 3rd graphic data storage area 13c. For example, in the case in which the triangle to be separated is the sequence number 1 triangle (with a category of 1st triangle), because the edge information (edge data) controlled by the 1st vertex is "edge data," the edge information of the vertex information read out from the 2nd graphic data storage area 11c is selected, and vertex data is output together with edge data.

As described above, when the vertex data and edge information for the 1st vertex of the triangle is output to the 3rd graphic data storage area 13c, the same processing is then performed with respect to the 2nd and 3rd vertices of the triangle, with the 2nd and 3rd vertex information being sequentially output to the 3rd graphic data storage area 13c.

Then, when the above processing has been completed for the 1st triangle, the vertex division section 12a again references the convex polygon display list which is stored in the 2nd graphic data storage area 11c, setting items such as the sequence number and pointers for the next triangle into the distribution information control table 13a, the next triangle being processed in the same manner as described above. The above processing is performed in sequence for each of the triangles to be separated from the convex polygon, and the display list, shown in FIG. 9, of the set of triangles separated from the convex polygon is generated.

Once the display list for the set of triangles is generated, all of the triangle drawing means of the triangle drawing device 14 simultaneously output the triangles that are stored in the triangle set display list to the display device 15 to draw the convex polygon. Because there is edge information stored in the triangle set display list which indicates whether edges are visible or invisible, when the triangle drawing device 14 draws triangles, it simultaneously draws the visible surrounding outline.

As described above, in this embodiment, because it is possible to store into the triangle set display list of the 3rd graphic data storage area 13c edge information which indicates whether the surrounding outline is to be made visible or invisible, it is possible for the triangle drawing device 14 to draw the triangles and the surrounding outline simultaneously. Therefore each of the triangle drawing means of the triangle drawing device 14 is capable of performing the next output processing as soon as the drawing of a triangle is completed, thereby eliminating the need to wait for the completion of drawing of all triangles as with the prior art technology, and improving the output speed.

While in the above-described embodiment, although the example shown was that of storing into the vertex information selection table 13b the sequence numbers for each triangle and the vertex information selection flags, because the edges of triangles belonging to the intermediate category are related in the same way to "divided edge data" and "edge data," it is also possible to have a configuration in which, for example, only fields for categories, edge sequence numbers, and vertex information selection flags are provided in the vertex information selection table 13b, with storage being made of only the vertex information selection flags corresponding to each edge of triangles belonging to the first, intermediate, and last categories, a determination being made at the time of referencing the vertex information selection table 13b of the triangle category, from the total number of separate triangles and the triangle sequence number, and the vertex information selection flag of the corresponding category being read out. It is also possible to have a configuration in which the triangle categories are stored in the distribution information control table 13a, this distribution information control table 13a being referenced for readout of the category, and a variety of other forms of tables is possible for the readout of vertex information selection flags.

Figure 10:
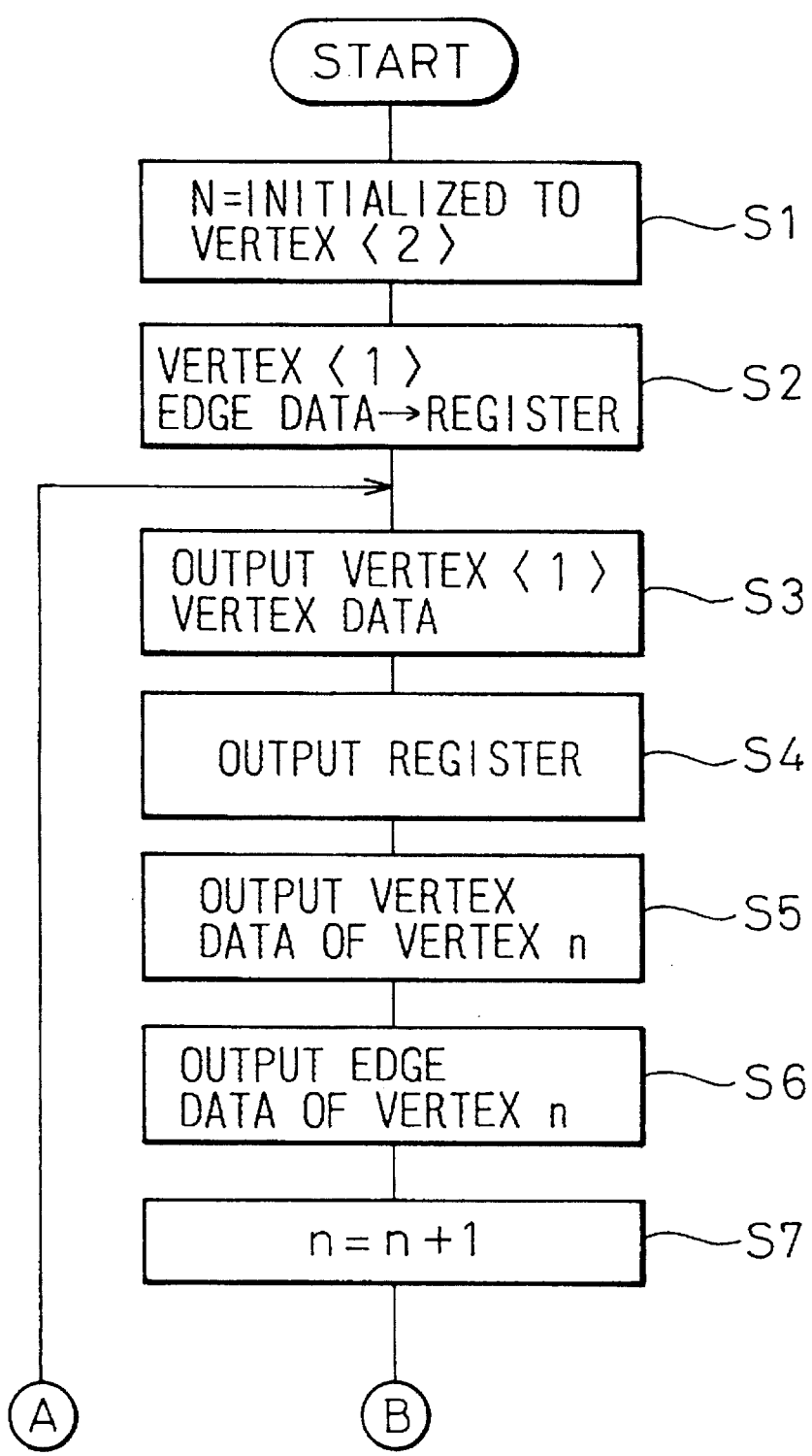
FIG. 10 is a flowchart which shows a different embodiment of the present invention.
Figure 11:
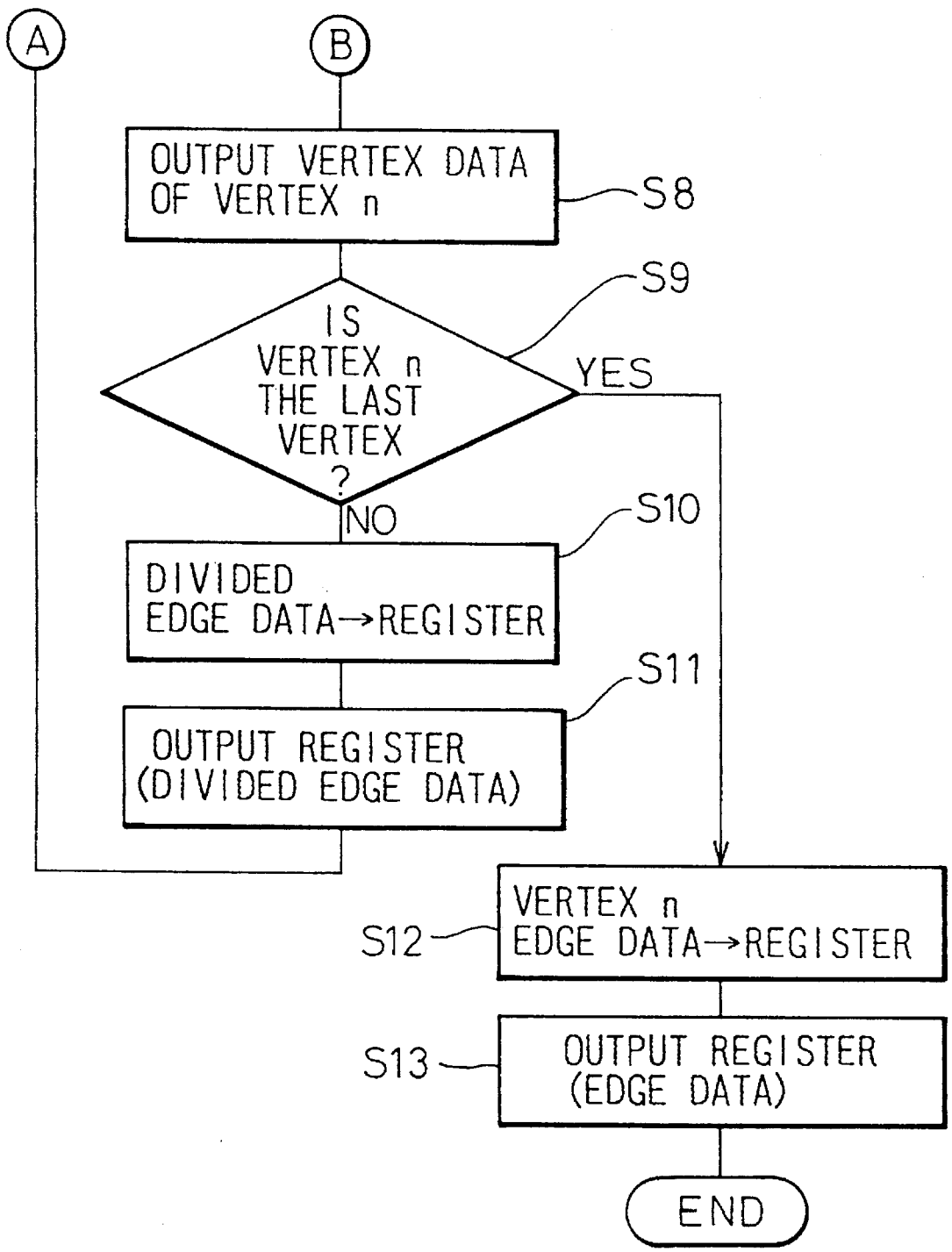
FIG. 11 is a continuation of the flowchart of FIG. 10 of a different embodiment of the present invention.

FIG. 10 and FIG. 11 show a flowchart of a different embodiment of the present invention, in which the configuration enables the output of edge information without using the vertex information selection flag 13b shown in the embodiment of FIG. 5.

Next, the output processing of triangle vertex information in the embodiment shown in FIG. 10 and FIG. 11 will be explained, with reference to the previously described block diagram of FIG. 5.

First, the vertex division section 12a references the convex polygon display list stored in the 2nd graphic data storage area 11c, and sets information such as the sequence numbers and pointers for the triangles to be separated into the distribution information control table 13a.

Next, at step S1 of FIG. 10, n is initialized as the 2nd vertex <2>, and at step S2 the edge information of the 1st vertex <1> is read out from the 2nd graphic data storage area 11c by referencing a pointer in the distribution information control table 13c, and this is stored into a register (not shown in the drawing), which is provided in the convex polygon division section 12.

At step S3, a pointer in the distribution information control table 13a is referenced to read the "vertex data" of the 1st vertex <1> from the 2nd graphic data storage area 11c, this read out "edge data" being output to the 3rd graphic data storage area 13c. At step S4, the contents of the register in which is stored the "edge data" of vertex <1> are output to the 3rd graphic data storage area 13c.

Next, at step S5, the "vertex data" of vertex n (in the beginning, n is initialized to the 2nd vertex <2>) is read out from the 2nd graphic data storage area 11c by referencing a pointer in the distribution information control table 13a in the manner as described above, the read out "vertex data" being output to the 3rd graphic data storage area 13c. At step S6, the "edge data" of vertex n (as noted above, at the beginning is initialized to the 2nd vertex <2>) is read out from the 2nd graphic data storage area 11c by referencing a pointer in the distribution information control table 13a, this edge data being output to the 3rd graphic data storage area 13c.

At step S7, n is incremented by 1 to n+1, and at step S8, the "vertex data" of vertex n (where n indicates the 3rd vertex <3>) is read out from the 2nd graphic data storage area 11c in the same manner as described above, this then being output to the 3rd graphic data storage area 13c.

At step S9, a determination is made as to whether vertex n is the last vertex in the convex polygon. If it is the last vertex, control proceeds to step 10, at which "divided edge data" which indicates that the surrounding outline is invisible is stored in a register, and at step S11 the "divided edge data" which was stored in the register is output to the 3rd graphic data storage area 13c, at which point return is made to step S3. Then, for the next triangle the convex polygon display list is referenced and data such as the sequence numbers and pointers for the separate triangles is set into the distribution information control table 13a, the above-described processing being repeated to generate the vertex information for the next triangle. That is, in the case in which the next triangle is the 2nd triangle, the vertex information for the triangle consisting of vertex <1>, vertex <3> and vertex <4> is generated and output to the 3rd graphic data storage area 13c.

By means of the above-described processing, the edge data and divided edge data for each separate triangle, indicated in the vertex information selection flag field of FIG. 8 are output, and the triangle set display list is generated in the same manner as in the 1st embodiment.

As explained above, in the present invention the separate triangles are categorized into first, intermediate, and last triangles, with selection being made of edge data or divided edge data based on that category information and on the edge number of each triangle, the vertex data of the polygon which is divided into triangles being output to the triangle drawing device together with either the selected edge data or divided edge data, thereby enabling not only the achievement of high-speed drawing processing, but also simplification of the system.

In addition, by providing a vertex information selection table into which is stored vertex information selection flags, by referencing this vertex information selection table to select either the edge data or the divided edge data, the selection of either the edge data or divided edge data is simplified.

I claim:

1. A divided polygon drawing method in which a polygon is divided by means of diagonal lines into a plurality of separate triangles, vertex information for said separate triangles is output to a triangle drawing section and the drawing is performed on a display device, the method comprising:

categorizing said separate triangles according to the number of edges of each triangle which correspond to respective edges of said polygon and edge data defining the position of each said triangle edge which corresponds to a respective edge of said polygon;

based on the category information and position information for the edges of each said triangle, selecting either the edge data of said triangle or divided edge data, which indicates a diagonal line of said polygon; and generating the vertex information on the basis of the vertex data of said separate triangles and the selected one of the triangle edge data and the divided edge data.

2. A divided polygon drawing device, comprising a polygon graphic data storage area in which is stored vertex information of a polygon, a polygon division section which divides said vertex information, which is stored in said polygon graphic data storage area into triangles, and a triangle set graphic data storage area in which is stored said vertex information of the set of triangles, and which device draws onto a display by outputting said vertex information of said triangle set which is stored in said triangle set graphic data storage area to a triangle drawing section, and wherein is provided a distribution data control table in which is stored data which establishes correspondence between said separated triangles and said vertex information which is stored in said polygon graphic data storage area, said polygon division section selecting, based on category data which indicates the number of edges of said separate triangles which correspond to edges of said polygon and on edge position information of said separated triangles, either edge data which is stored in said polygon graphic data storage area, or divided edge data, which indicates a diagonal line of the polygon, the results of said selection being used as the basis for referencing said distribution data control table to read out said vertex data and edge data of said separate triangles from said polygon graphic data storage area or vertex data and to generate triangle vertex information from said edge data or divided edge data and vertex data.

3. A polygon dividing drawing device according to claim 2, further comprising a vertex information selection table into which are stored vertex information selection flags, which indicate that selection is to be made of triangle category data, triangle edge numbers, or edge data or divided edge data corresponding to these, and said triangle division section referencing said vertex information selection table to read out said vertex information selection flags which correspond to category information and edge position information of said separate triangles, said read out vertex information selection flags being used as the basis for selection of either said edge data which are stored in said polygon graphic data storage area, or said divided edge data, which indicates a diagonal line of the polygon, and for generation of vertex information for said triangles.

* * * * *

UNITED STATES PATENT AND TRADEMARK OFFICE
CERTIFICATE OF CORRECTION

PATENT NO. : 5,581,673
DATED : Dec. 3, 1996
INVENTOR(S) : KIKUCHI

It is certified that error appears in the above-indentified patent and that said Letters Patent is hereby corrected as shown below:

Col. 4, line 18, after "iii', i'," insert --iv'--.

Col. 5, line 40, delete "of".

Col. 6, line 34, after "data" (second occurrence) insert --,--.

Col. 7, line 16, change "13ainto" to --13a into--.

Col. 10, line 32, change "13ais" to --13a is--;
line 41, change "13ain" to --13a in--.

Signed and Sealed this

Eighteenth Day of March, 1997

Attest:

BRUCE LEHMAN

*Attesting Officer*     *Commissioner of Patents and Trademarks*